(12) United States Patent  
Nishimura

(10) Patent No.: US 8,998,110 B2
(45) Date of Patent: Apr. 7, 2015

(54) SAFE HANDLING SPRAYING DEVICE

(76) Inventor: Takashi Nishimura, São Paulo (BR)

(*) Notice: Subject to any disclaimer, the term of this patent is extended or adjusted under 35 U.S.C. 154(b) by 1025 days.

(21) Appl. No.: 12/996,353

(22) PCT Filed: Oct. 20, 2008

(86) PCT No.: PCT/BR2008/000317
§ 371 (c)(1),
(2), (4) Date: Dec. 3, 2010

(87) PCT Pub. No.: WO2009/146515
PCT Pub. Date: Dec. 10, 2009

(65) Prior Publication Data
US 2011/0095100 A1 Apr. 28, 2011

(30) Foreign Application Priority Data
Jun. 6, 2008 (BR) ..................................... 0802100

(51) Int. Cl.
| A62C 13/62 | (2006.01) |
| A62C 13/66 | (2006.01) |
| A62C 31/00 | (2006.01) |
| B05B 7/32 | (2006.01) |
| B05B 7/24 | (2006.01) |
| A01C 23/04 | (2006.01) |

(52) U.S. Cl.
CPC ............. B05B 7/2472 (2013.01); A01C 23/047 (2013.01); B05B 7/2467 (2013.01); B05B 7/2475 (2013.01); B05B 7/2481 (2013.01); B05B 7/2416 (2013.01); B05B 7/32 (2013.01)

(58) Field of Classification Search
USPC ......... 239/303, 304, 308, 310, 323, 328, 330, 239/337, 356, 373, 407, 408, 413, 414
See application file for complete search history.

(56) References Cited

U.S. PATENT DOCUMENTS

| 3,521,671 | A | * | 7/1970 | Handeland | ................. 137/564.5 |
| 3,720,230 | A | * | 3/1973 | Stockstill | ................... 137/564.5 |
| 4,635,848 | A | * | 1/1987 | Little | ........................... 236/46 R |
| 5,890,624 | A | * | 4/1999 | Klima et al. | .................... 222/82 |
| 5,899,362 | A | * | 5/1999 | Moran | .......................... 222/136 |
| 2006/0086753 | A1 | * | 4/2006 | Newton | ........................ 222/105 |
| 2007/0102541 | A1 | * | 5/2007 | MacLean-Blevins | ........ 239/313 |

FOREIGN PATENT DOCUMENTS

WO   WO 96/00170 A1   1/1996

* cited by examiner

*Primary Examiner* — Ryan Reis
(74) *Attorney, Agent, or Firm* — Arent Fox LLP

(57) ABSTRACT

Safe handling spraying device, which comprises a reservoir where is assembled an actuating lever or, manually or automatically actuating air pumps, that perform the internal reservoir pressurization. Inside of it, there is a pressure chamber where is stored water and the Chemical Concentrated product that is inside a pliable tightly closed bag. The reservoir (10) is designed for supplying water (Ag), the chemical concentrated product (CCP) is stored separately in a pliable container (12). The pliable container (12) is disposed inside of a pressure chamber or water reservoir (10), so that the same pressure defined inside the reservoir (10) is applied to the pliable container (12) simultaneously. The output end of the pliable container (12) is connected to the inlet of a mixing device (20) which doses the CCP continuously. After the CCP had been mixed with water, it communicates with a hose provided with an actuating trigger (30) and spraying nozzle (27) at the free end.

7 Claims, 6 Drawing Sheets

SAFE HANDLING SPRAYING DEVICE

CROSS-REFERENCE TO RELATED APPLICATION

This application is a National Stage entry of International Application No. PCT/BR2008/000317, filed Oct. 20, 2008, which claims priority of Brazilian Application No. PI 0802100-7, filed Jun. 6, 2008. The disclosure of the prior application is hereby incorporated in its entirety by reference.

DISCLOSURE OF THE INVENTION

The present invention is directed to a safe handling spraying device that can be manually or automatically actuated, to be agriculturally or residentially used, wherein, water and a chemical concentrated product (CCP) are automatically mixed at the time the solution is sprayed. As known by those ones skilled in the art, the conventional agricultural or residential spraying devices that are manually or automatically actuated are supplied with mixtures of water and a chemical concentrated product (CCP) previously prepared at the defined ratio in the directions of the product, and that ready-made mixture is poured into the spraying device reservoir.

Generally, the existing spraying devices are divided into three types: an inner pressure spraying device (FIG. 1), a pressurized piston cylinder system present (FIG. 2), and an automated spraying device (FIG. 3) that can be pressurized either by a piston or a diaphragm.

All the equipment described above have a reservoir where is stored a diluted mixture of CCP and water, and in some cases CCP and oil instead of water.

All of them require the handling of the CCP in every new filling operation, exposing then, a direct contact of the operator with the extremely toxic CCP every 30 to 50 minutes.

This traditional constructive conception that activates the spraying device, FIG. 2, activate the piston through a lever when the liquid in the reservoir, the mix, water and CCP, is sucked and injected into the pressure chamber. This chamber is tightly closed, so that as the liquid gets inside, the inner pressure increases compressing the air therein. There is a tightly closed trapping pipe in the pressure chamber, externally connected to a hose provided with an actuating trigger with a spraying nozzle at the opposite free end.

Although widely used in a satisfactory way, such conventional sprinkles or spraying devices have inconveniences, as the Chemical Concentrated product is manipulated by the operator, who gets in touch with the extremely toxic CCP, it may cause illnesses and even death, besides using unsuitable dosages due to operation mistakes.

Consideration should be given to the fact that any leakage of the mixed chemical product may intoxicate the operator.

All of the conventional spraying situations need the chemical product manipulation (CCP) to dilute it into the spraying water. Since a spraying reservoir may work continuously for 30 to 50 minutes, the operator has to manipulate the Chemical product in those periods, when he will be exposed to the contamination or to the direct contact with the chemical product every time the device will be filled, without a minimum of a safety condition.

Therefore, one of the targets of the present invention is to provide a safe handling spraying device that can be manually or automatically actuated which does not require that the operator manipulates the chemical concentrated product (CCP) at all, thus, reducing the direct contact of the operator with the toxic matter partially present in the mixture or solution to be sprayed.

The merit of the present invention is to fully eliminate the operator contact with the CCP, wherein the reservoir of the device is only supplied with clean water, and the CCP is stored inside a container or pliable plastic bag inside the water reservoir, but with no contact and no possibility of mixing the CCP with the clean water.

The space within the tank, when it is pressurized, exposes both the water inside the tank and the pliable bag containing the CCP to the same pressure, in a safety and precision conditions.

The pressurized water inside the tank is expelled through a trapping pipe that goes through the mixing device.

The CCP leaves the pliable pouch that is compressed by the same pressure of the reservoir through a long pipe and it also goes through the mixing device and it is drawn out in the water outflow, mixing among each other and forming a diluted solution for the spraying.

Those and other targets and advantages of the present invention are reached with a manually or automatically actuated spraying device which is comprised by a reservoir where a manually actuated air pump or an electric or motorized compressor is assembled that promotes the inner pressurization of the reservoir, in which the water and the chemical concentrated product are contained. According to the invention, the CCP is inside of a tightly closed pliable bag or container, whereas the reservoir is only and exclusively designed to the clean water supply. So that the chemical concentrated product (CCP) is contained separately in the pliable bag or container and subject to the action of air pressures inside the water reservoir, and the pliable container is assembled inside the reservoir to be submerged or not in the body of water, so that the same pressure defined inside the reservoir is applied to the pliable container simultaneously, in the interior of which the chemical concentrated product CCP) is contained. The pliable container is tightly closed and having the output end thereof connected to the inlet of a mixing device, FIG. 7, that has two inlets, one, of which is the clean water inlet pipe by a trapping pipe inside the water reservoir.

The basic mixer has two inlets and one outlet, where another inlet is for the chemical concentrated product that goes through the outflow regulating needle and it is mixed with the clean water flow that goes through the mixing device and draws the already dosed (CCP) along, going through the actuating trigger and the spraying nozzle.

The present invention will be described below with reference to the following drawings, where:

Figure 9:
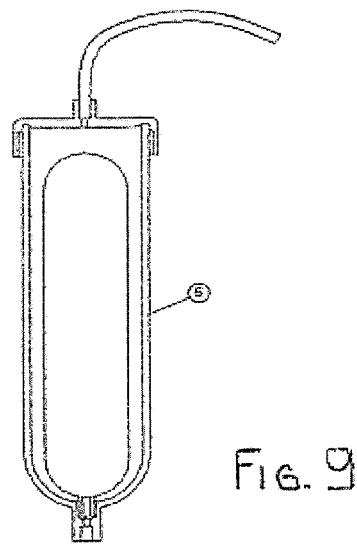

FIG. 9 is a front elevation view of the pliable container lodged in its tightly closed rigid covering housing; when due to another design and/or through an option the pliable CC container is kept outside the water reservoir and it could be placed inside a rigid tightly closed box connected through a pipe to the upper portion of the water reservoir, in order to provide the pliable CCP container inside the outer tightly closed box with the same pressure that is applied to the water reservoir.

Figure 10:
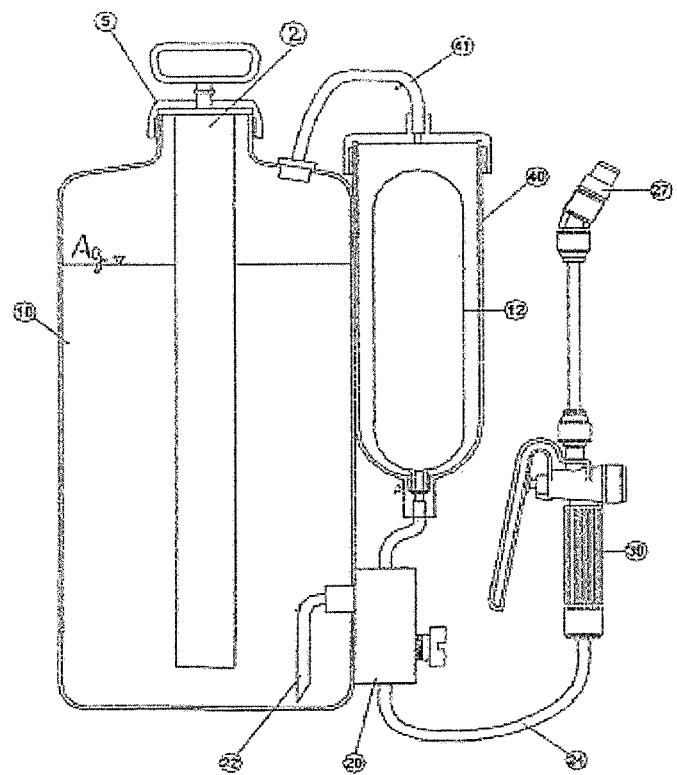
Figure 11:
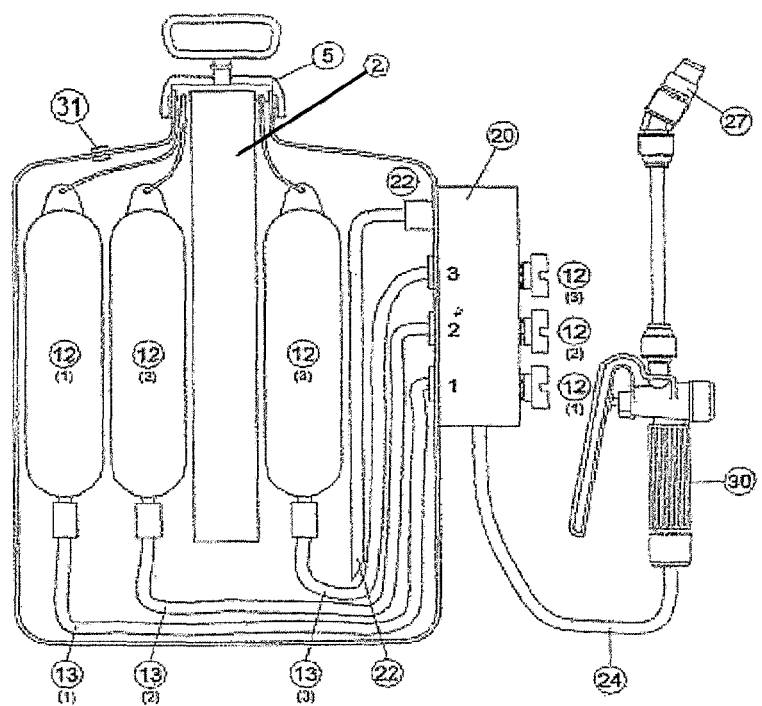
Figure 12:
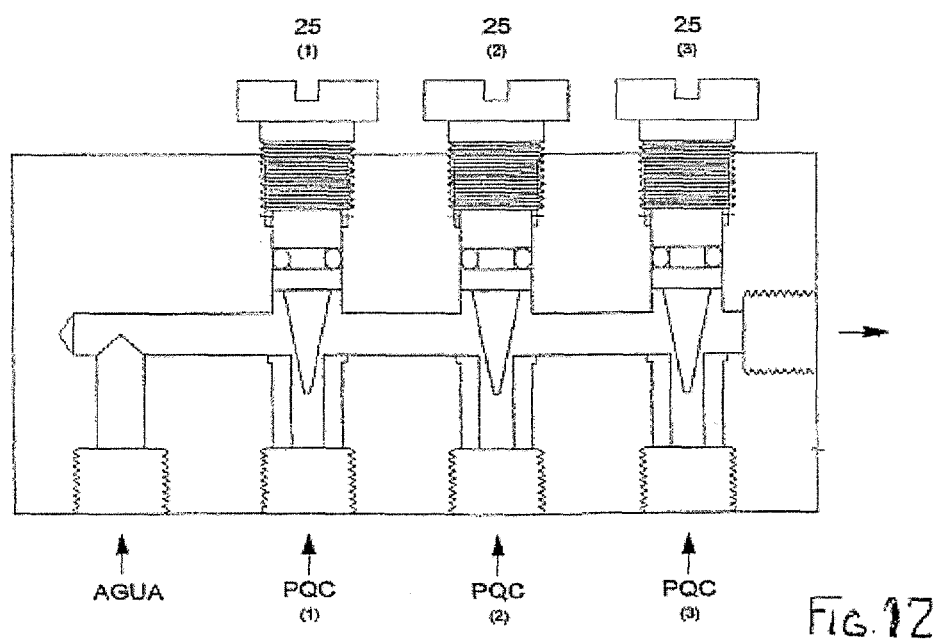

FIG. 10 is a front elevation view of a second version of the improved spraying device, where the pliable CCP container is inside an outer tightly closed box assembled next to the reservoir, but outside of it; and FIGS. 11 and 12 are, respectively, a front elevation view of the improved spraying device provided with multiple pliable containers inside, each one having a CCP, and an enlarged detailed view of the mixing device provided with multiple inlets compatible with the number of pliable containers provided in the spraying device.

Figure 1:
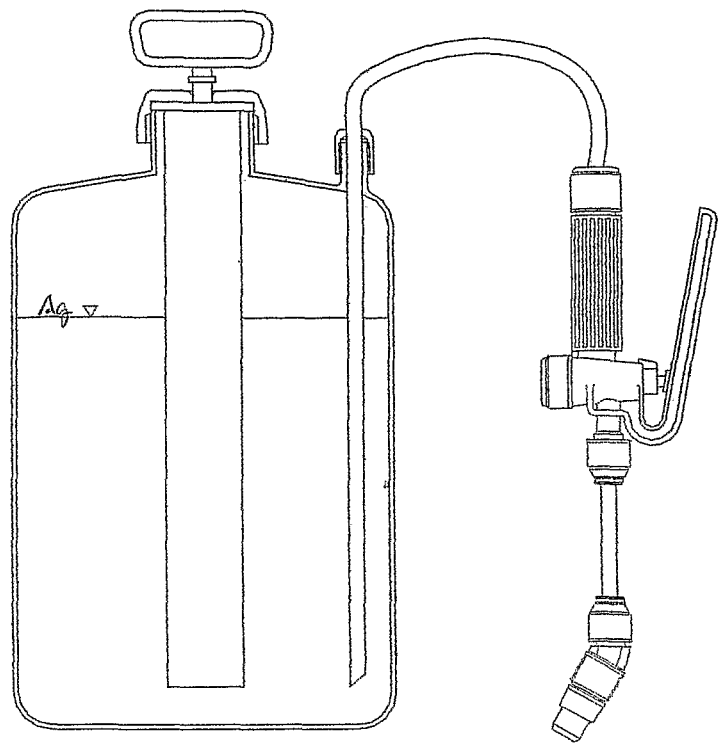
FIGS. 1, 2 and 3 are front elevation views of conventional spraying devices in the state of the art, showing the inner disposal of the pressurization chamber.
Figure 2:
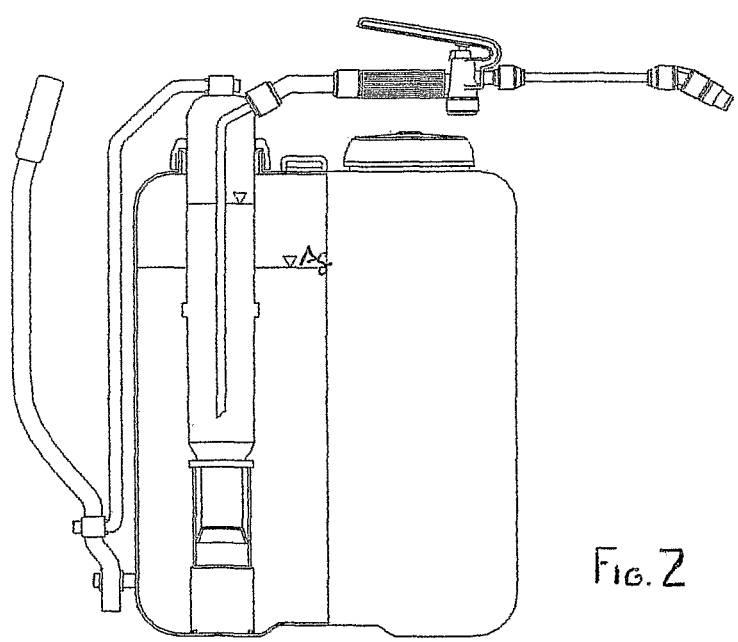
Figure 3:
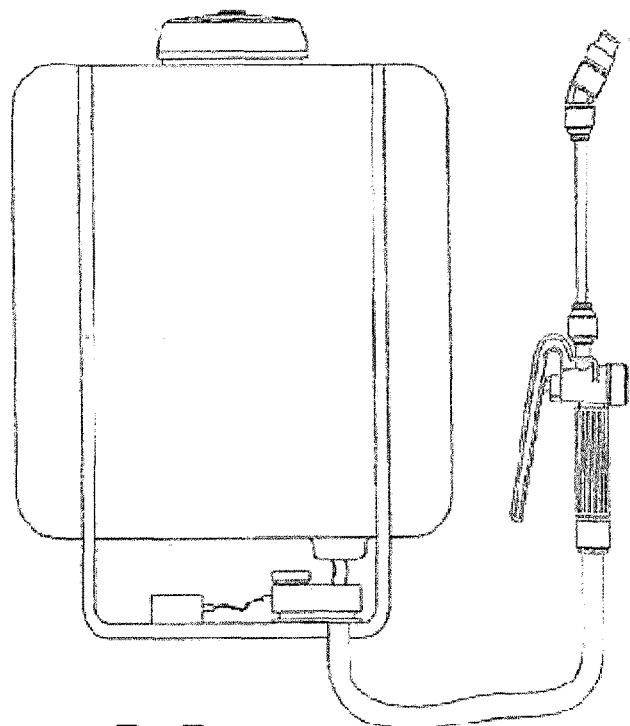
Figure 4:
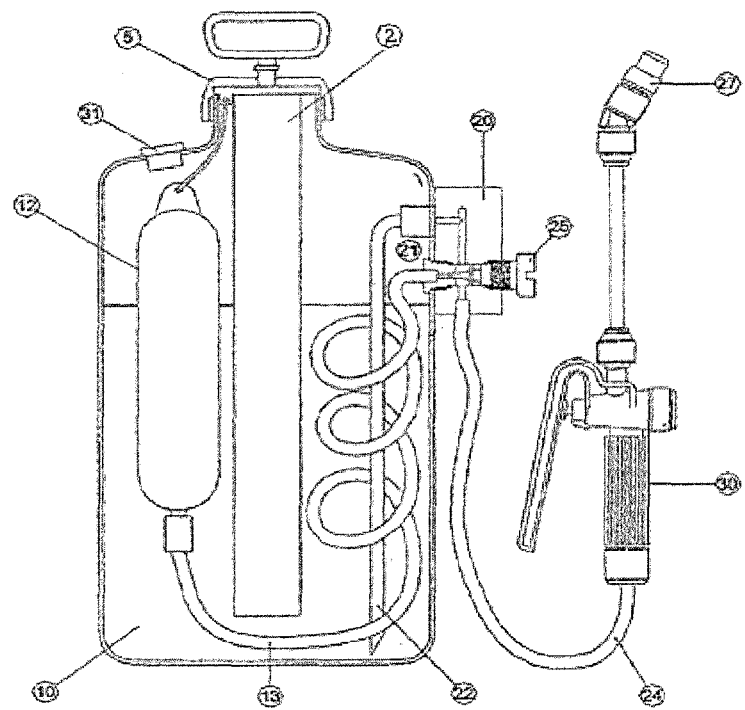
FIGS. 4, 5 and 6 are front elevation views of improved spraying devices of the present invention, illustrating the inner disposal of the pressurization chamber.
Figure 5:
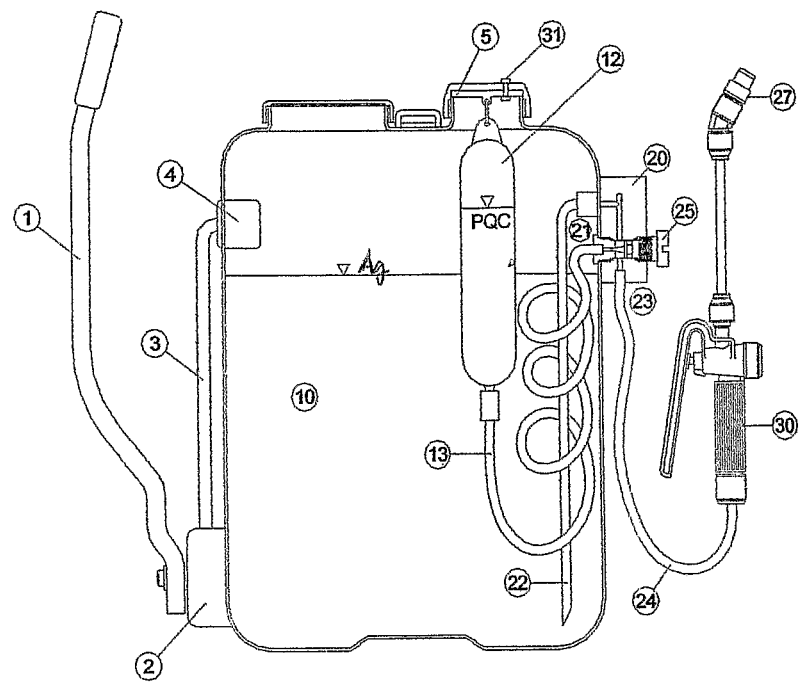
Figure 6:
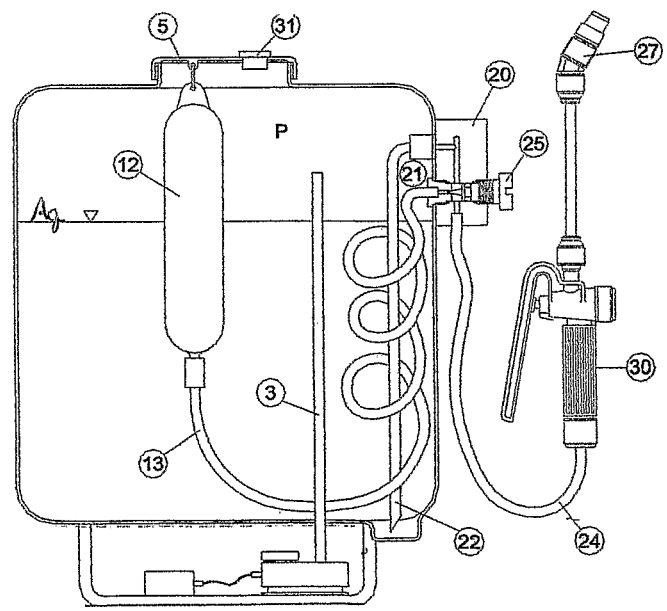

According to those illustrations and more specifically FIG. 5, the safe handling spraying device of the present invention is comprised by a reservoir 10 where an actuating lever 1 is assembled that promotes the pressurization inside the reservoir 10, in which is contained water Ag and the chemical concentrated (CCP), which is contained in the CCP pliable container 12, in a first version, inside the reservoir 10 and submerged or not in the water Ag. According to the invention, the reservoir 10 is only and exclusively designed for supplying water (Ag), with the chemical concentrated product (CCP) being contained separately in a pliable container 12 subject to the action of the pressures in the pressure chamber inside the water reservoir 10.

Since the pliable container 12 is assembled inside the reservoir 10 and submerged or not in the water Ag, the same pressure internally defined to the reservoir 10 is the pressure applied simultaneously to the pliable container 12, where the chemical concentrated product (CCP) is contained inside. Thus, one same pressurization is felt by both the water Ag inside the pressure chamber 10 and the chemical concentrated product (CCP) inside the pliable container 12; in this constructive version, the reservoir 10 defines the pressure chamber of the spraying device, see FIG. 5.

As it can be seen in FIG. 5, the pliable container 12 is tightly closed and its output end is connected by means of pipe 13 to the inlet 21 of a mixing device 20, which another inlet 22, defines the trapping pipe inside the water reservoir 10; the outlet 23 connects the outlet of the mixing device 20, through a pipe or a hose 24, to an actuating trigger 30 disposed by a spraying nozzle 27 at the free end.

With this constructive conception applied to the safety handling spraying device which can be manually or automatically actuated, it may get a functional and equalized application of mixture, since when the interior of reservoir 10 is compressed by the angular motion of the lever 1 or through a conventional air pump or through a motorized, electric or gasoline-propelled compressor, the pressure generated inside the chamber 10 compresses the pliable container 12, inside which the (CCP) is present, compressing it with the same pressure inside the reservoir 10.

In more details, when the lever 1 is actuated, an air pump 2 is actuated to convey the air through the pipe 3 to a return valve 4 assembled inside the reservoir 10, so that valve 4 allows the air to be injected inside the water reservoir 10, thus pressurizing the system.

Also, a mixing device 20 which receives the clean water that is contained in the reservoir 10 under pressure and through the pipe 22 is disposed outside the spraying device. In turn, the internal pressure of the reservoir 10 pressurizes the pliable container 12 fully filled with the chemical concentrated product (CCP) which also expels an equivalent amount of (CCP) through the pipe 13 connected to the inlet 21 of the mixing device 20.

Figure 7:
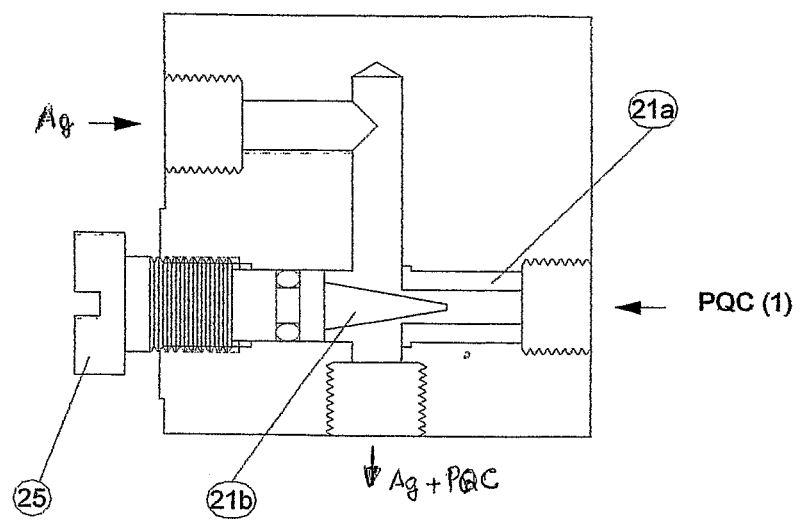
FIG. 7 is an enlarged detailed view of the mixing device 20 that it is assembled between the water reservoir, the (CCP) container and the spraying nozzle.

This mixing device 20 is provided with a screw 25, FIG. 7, whose extremity has a needle 21b that defines the calibrated inlet thereof, which fits into a plug 21a to where the outlet pipe 13 of the pliable container 12 is connected. By pressing the screw 25 against the plug 21a, the flow of (CCP) is fully stopped, thus by opening and closing the space between the needle 21b and the plug 21a the outflow of (CCP) is controlled.

Figure 8:
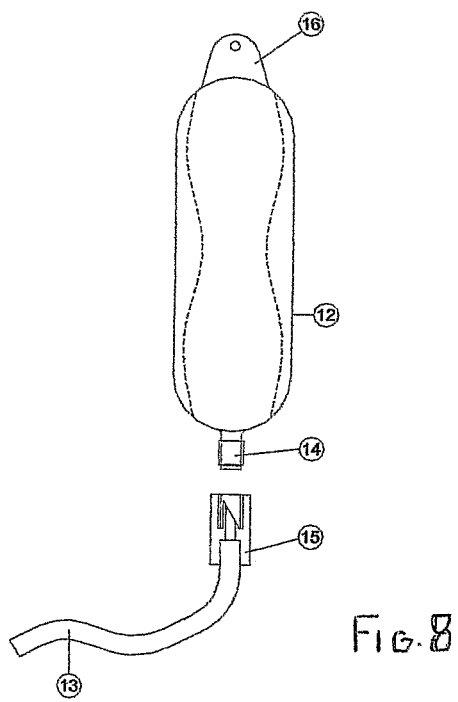
FIG. 8 is an enlarged elevation view of the pliable container for conditioning (CCP) in its condition of the highest inner volume and connected to pipe 13 that is partially illustrated, to interconnect the mixing device.

To replace the pliable container 12, just pull out the pin of the safety valve, and open the cover 5, where it is suspended. The container 12 should be pulled out from the interior of the water reservoir 10, FIG. 8, until it gets completely empty and allows a 180° movement thereof, so that the connecting nozzle 14 is at the top. Then next, the cover 15 of the connecting nozzle 14 is released, and the empty container is replaced by another one filled with (CCP).

To put it back, just push the outlet pipe 13, whose full length makes the removal and a 180° inversion of the container 12 handling possible, into the reservoir 10, and by attaching the container 12 on the cover 5 through the orifice 16, the cover 5 is closed on the reservoir 10. Fill the reservoir 10 with clean water, actuate the lever 1 and restart.

It should be noticed that there is a drilled edge disposed on the cover of the nozzle 15 where the connector is assembled, not illustrated, that punctures the seal of the pliable container 12 when pressed.

The present invention consists in compressing air inside the reservoir 10 with clean water, whose pressure pressurizes the pliable container 12 uniformly with (CCP), thus providing the possibility of dispensing the mixture of CCP+ water uniformly even if the pressure inside the reservoir is changed, the latter one, such as in the first version, may be inside the water reservoir 10, or in a second version, FIG. 10, may be assembled next to reservoir 10 but outside it. When it is out of the reservoir 10, the container 12 should be inside a tightly closed housing 40, but in communication with the upper part of the reservoir 10 where there is only air, through an air inlet 41. This air inlet 41, when connected through a pipe to the reservoir 10, assures a free fluid communication between the reservoir 10 and the housing 40 so the pressure inside the latter one and the pressure of the reservoir 10 are the same.

The pressure used for spraying is produced by the pressure inside the reservoir 10 that compresses the pliable container 12, pressurizing the (CCP) at the same pressure of the reservoir 10. This mixture is equalized by the mixing device 20 through its outflow regulating screw 25 that controls and equalizes the output pressure of the liquids (water and CCP) in the pipe or hose 24 of the spraying device outlet, where the actuating trigger 30 is disposed.

The orifice diameter of the plug 21a and the needle diameter 21b at the tip of the screw 25 are sized differently in order to fulfill different viscosities of the (CCP) that will be used, and they may be replaced.

The safety regarding CCP leakage is total in any position the device is placed, and the contact of the operator with the CCP is eliminated as well.

To prepare a mixture of two or more different (CCP)'s, FIG. 11 and FIG. 12, just make more inlets in the controlling device 20, screw 25 with the needle 21b, the calibration plug 21a adjusted to the viscosity of the (CCP).

After using the device, to clean the actuating trigger 30, the pipe and nozzle 27, just press the screw 25, until the needle 21B touches its end against the plug 21a and next open the actuating trigger. The clean water goes through the pipes and washes the actuating trigger 30, the nozzle 27 and the pipes.

Therefore, the main purpose of the present invention is a system for controlling the dilution of a liquid product with one or more liquid of different concentrations. This mixture is controlled due to the same pressure inside the water reservoir and the chemical concentrated product that is inside an elastic bag or container, either inside or outside the device.

In the present invention, the manipulation of the chemical is highly safe, since the water reservoir will be supplied only with clean water, and it will have a chemical concentrated product container which will be only manipulated in some cases, after 20 or more water supplies, meaning that the CCP package is only manipulated in every 16 and 20 working hours, with much less frequency and in a safe operation.

The invention claimed is:

1. A safe handling device, comprising:
    a reservoir defining a pressure chamber configured to contain water, the reservoir having a cover;
    a pressurizing mechanism for pressurizing the pressure chamber;
    a pipe having a first end in communication with the pressure chamber and a second end;
    a spraying nozzle having an actuating trigger;
    a pliable container suspended on the cover of the reservoir at a first end of the pliable container, the pliable container configured to contain a chemical concentrated product and a quantity of air or oil;
    a connecting nozzle at a second end of the pliable container;
    a hose having a first end and a second end;
    a nozzle cover connected between the first end of the hose and the connecting nozzle, the nozzle cover having a needle for opening the pliable container;
    an outlet hose having a first end and a second end, the second end connected to the actuating trigger of the spraying nozzle; and
    a mixing device disposed outside of the reservoir, the mixing device having a first inlet connected to the second end of the pipe, a second inlet connected to the second end of the hose, and an outlet connected with the first end of the outlet hose.

2. The safe handling spraying device of claim 1,
    wherein the pliable container is located inside a closed housing outside the reservoir,
    wherein the spraying device further comprises an air inlet pipe having a first end connected to an upper part of said reservoir, and a second end connected to the pliable container, thereby assuring the same pressure, and
    wherein the closed housing operates only with air pressure, preventing accidents when chemicals products react with water.

3. The safe handling spraying device of claim 1, wherein the pressurizing mechanism comprises an air pump, a pipe, and an actuating lever, wherein the actuating lever actuates the air pump to convey air through the pressurizing pipe to a return valve located on the internal side of the reservoir, so that the return valve allows the air to be injected into the water reservoir, thereby pressurizing the reservoir.

4. The safe handling spraying device of claim 1, wherein the mixing device comprises a screw with a needle at the end of the screw that defines a calibrated inlet, wherein the needle of the mixing device fits into a plug where the second end of the output hose of the pliable container is disposed, and wherein the flow of chemical concentrated product is fully stopped when the screw is pressed against the plug.

5. The safe handling spraying device of claim 1, wherein the pliable container is liftable inside the reservoir, at the cover of the reservoir, upside-down, to auto-clean an empty container, wherein the connecting nozzle is only opened by the needle of the nozzle cover.

6. The safe handling spraying device of claim 5, wherein the pliable container is replaceable by detaching an upper end of the pliable container from the cover of the reservoir and detaching the nozzle cover from the connecting nozzle.

7. The safe handling spraying device of claim 1 further comprising:
    a plurality of pliable containers and a plurality of hoses connected to the plurality of containers,
    wherein the mixing device comprises a plurality of inlets in communication with the plurality of pliable containers, and
    a conical needle inside a hole of a plug connected to one of the plurality of hoses, wherein the conical needle is configured to control a flow of concentrated chemical product from each of the plurality of pliable containers thereby enabling selected mixing of two or more concentrated chemical products without opening the reservoir.

* * * * *